May 10, 1932.  H. WEISNER  1,857,226

NECKTIE PIN

Filed Jan. 16, 1932

Inventor:
Harry Weisner,
By Jas.C.Wobensmith
Attorney.

Patented May 10, 1932

1,857,226

UNITED STATES PATENT OFFICE

HARRY WEISNER, OF PHILADELPHIA, PENNSYLVANIA

NECKTIE PIN

Application filed January 16, 1932. Serial No. 587,053.

My invention relates to a necktie pin, which is adapted to be secured on the rear of a "four-in-hand" necktie (where it will not be seen), for the purpose of maintaining the proper appearance of the necktie while the same is being worn.

The object of my invention is to provide a simple and efficient device, adapted for use in connection with a "four-in-hand" necktie, which will prevent the tongue portion of the necktie from slipping with respect to the knot, and at the same time hold the upper portion of the apron of the necktie, immediately below the knot, properly spread, so that the necktie will at all times present a pleasing and attractive appearance.

The nature and characteristic features of my invention will be more readily understood from the following description, taken in connection with the accompanying drawings forming part hereof, in which.

Figure 1:
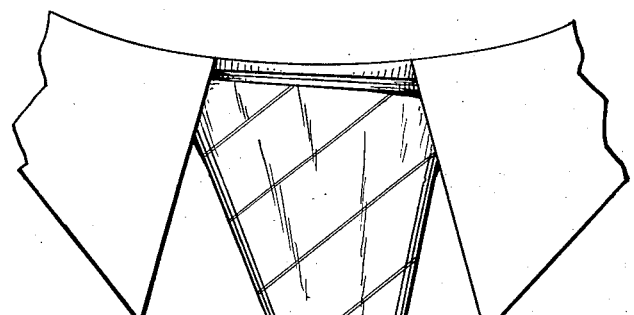
Figure 1 is a front elevation of a portion of a necktie, the device of my present invention being shown in dotted lines in connection therewith.
Figure 5:
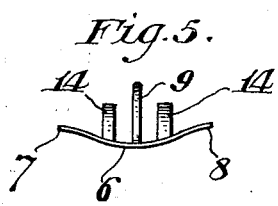
Fig. 5 is a top or plan view thereof.
Figure 2:
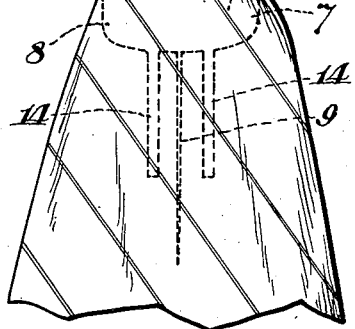
Fig. 2 is a rear elevation of a portion of the necktie, with the device in place.
Figure 2:
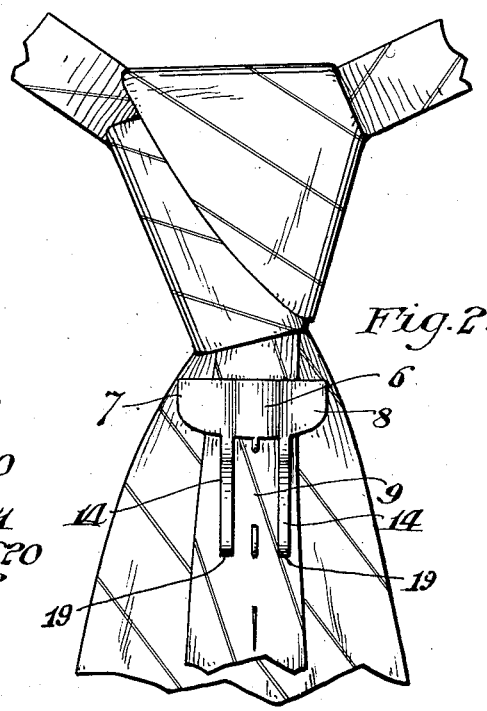
Figure 3:
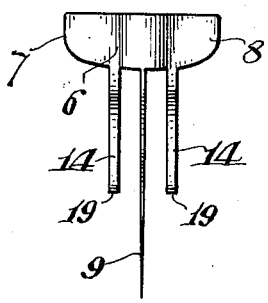
Fig. 3 is a front elevation of the device, detached.
Figure 4:
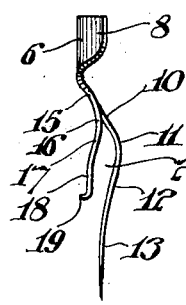
Fig. 4 is a side elevation thereof.

Referring to the drawings, in the particular embodiment of my invention therein shown, 6 is a spreader plate, which, when the device is mounted upon the necktie, is positioned immediately below the knot thereof, on the rear. The spreader plate 6 is provided with wing portions 7 and 8 which serve to maintain the top of the apron of the necktie spread in an attractive manner.

The spreader plate 6 is arched or bowed in horizontal plan, and the wing portions 7 and 8 thereof are slightly flattened, this shape serving to accommodate the spreader plate to the extra thickness of the tongue portion of the necktie.

Centrally disposed with respect to the spreader plate 6, and extending downwardly therefrom, in sinuous form, is a pin 9. The pin 9 preferably extends first forwardly, as at 10, is then curved as at 11, then extends rearwardly as at 12, and then extends downwardly, substantially straight, as at 13, to the point thereof.

Arranged on each side of the pin 9, and extending downwardly from the spreader plate 6, also in sinuous form, is a finger 14. The fingers 14 also preferably extend forwardly, as at 15, to a curved portion 16, then extend rearwardly as at 17, and then downwardly substantially straight, as at 18, terminating in rearwardly curving lugs 19.

The forwardly extending portions 15 of the finger members 14 are arranged substantially in the same plane as the forwardly extending portion of the pin 9, but these forwardly extending portions of the finger members are somewhat shorter in length than the forwardly extending portion 10 of the pin, so as to provide a space 20 between the plane of the rearwardly extending portion of the pin and that of the portions 17 of the fingers, this space serving to accommodate the device to the thickness of the tongue portion of the necktie.

In the use of the device, the "four-in-hand" necktie is first tied in the usual manner, after which the point of the pin of the device is inserted in the necktie through the tongue portion thereof, immediately below the knot. The pin is then pushed downwardly, and is woven backwardly and forwardly through the filling of the apron portion of the necktie, and entirely through the tongue portion thereof.

The device being pushed downwardly as far as possible, the upper marginal edge of the spreader plate is then positioned immediately below the knot portion of the necktie, serving to spread the apron portion thereof, as well as preventing the slipping of the tongue portion with respect to the knot.

I claim:

1. A necktie pin adapted to be positioned in the rear of a "four-in-hand" necktie, comprising a spreader plate having wing portions adapted to engage the apron portion of the necktie adjacent the knot; a centrally disposed pin extending downwardly from the spreader plate; and a finger member disposed on each side of the pin and extending downwardly from the spreader plate; the pin being adapted to be inserted through the tongue portion and part of the apron portion of the necktie, and the finger members being adapted to engage the tongue portion of the necktie on the rear thereof.

2. A necktie pin adapted to be positioned in the rear of a "four-in-hand" necktie, comprising a spreader plate having wing portions adapted to engage the apron portion of the necktie adjacent the knot; a centrally disposed pin extending downwardly from the spreader plate in sinuous form; and a finger member disposed on each side of the pin and extending downwardly from the spreader plate in sinuous form; the pin being adapted to be inserted through the tongue portion and part of the apron portion of the necktie, and the finger members being adapted to engage the tongue portion of the necktie on the rear thereof.

3. A necktie pin adapted to be positioned in the rear of a "four-in-hand" necktie, comprising a spreader plate having wing portions adapted to engage the apron portion of the necktie adjacent the knot; a centrally disposed pin extending downwardly from the spreader plate, said pin extending first forwardly, then backwardly, and then downwardly to the point thereof; and a finger member disposed on each side of the pin and extending downwardly from the spreader plate, said finger members extending first forwardly, then rearwardly, and then downwardly; the pin being adapted to be inserted through the tongue portion and part of the apron portion of the necktie, and the finger members being adapted to engage the tongue portion of the necktie on the rear thereof.

4. A necktie pin adapted to be positioned in the rear of a "four-in-hand" necktie, comprising a spreader plate having a curved central portion adapted to extend over the tongue portion of the necktie, and wing portions adapted to engage the apron portion thereof adjacent the knot; a centrally disposed pin extending downwardly from the spreader plate, said pin extending first forwardly, then backwardly, and then downwardly to the point thereof; and a finger member disposed on each side of the pin and extending downwardly from the spreader plate, said finger members extending first forwardly, then rearwardly, and then downwardly, parallel to but in a different plane from that of the corresponding plane of the pin; the pin being adapted to be inserted through the tongue portion and part of the apron portion of the necktie, and the finger members being adapted to engage the tongue portion of the necktie on the rear thereof.

In testimony whereof, I have hereunto signed my name.

HARRY WEISNER.